United States Patent
Galletti

(10) Patent No.: US 6,435,515 B1
(45) Date of Patent: Aug. 20, 2002

(54) SEAL ASSEMBLY FOR INSTALLATION ON SHAFTS OF MIXERS FOR CONCRETE, MORTAR AND SIMILAR MIXTURES

(75) Inventor: Paolo Galletti, Perugia (IT)

(73) Assignee: Officine Meccaniche Galletti O.M.G. - S.R.L. (IT)

( * ) Notice: Subject to any disclaimer, the term of this patent is extended or adjusted under 35 U.S.C. 154(b) by 0 days.

(21) Appl. No.: 09/510,261

(22) Filed: Feb. 22, 2000

(30) Foreign Application Priority Data

Mar. 2, 1999 (IT) ........................................ AN990008 U

(51) Int. Cl.$^7$ ................................................. F16J 15/34
(52) U.S. Cl. .................... 277/407; 277/402; 277/551; 277/572; 277/576; 366/314; 366/331
(58) Field of Search ................................. 277/402, 407, 277/370, 375, 551, 553, 572, 576; 403/24, 288; 366/314, 331, 64

(56) References Cited

U.S. PATENT DOCUMENTS

| | | | |
|---|---|---|---|
| 3,921,962 A | * 11/1975 | Feger et al. | 277/402 |
| 4,881,829 A | * 11/1989 | Koelsch | 277/408 |
| 5,044,809 A | * 9/1991 | Galanty et al. | 403/24 |
| 5,655,845 A | * 8/1997 | Lampart | 384/480 |

FOREIGN PATENT DOCUMENTS

DE          3736435 A1   *  5/1989

* cited by examiner

*Primary Examiner*—Anthony Knight
*Assistant Examiner*—Enoch E Peavey
(74) *Attorney, Agent, or Firm*—Robert M. Gamson; Leonard Bloom

(57) ABSTRACT

The present invention relates to a seal assembly for installation on shafts of mixers for concrete, mortar and similar mixtures, of the type comprising sliding rings in oil bath, characterised in that it also comprises, on the side facing the inside of the mixing tank, an annular gasket preferably made of Vulkolan/adiprene, capable of preventing any risk of mixture leakage out of the tank.

4 Claims, 1 Drawing Sheet

Figure 1:
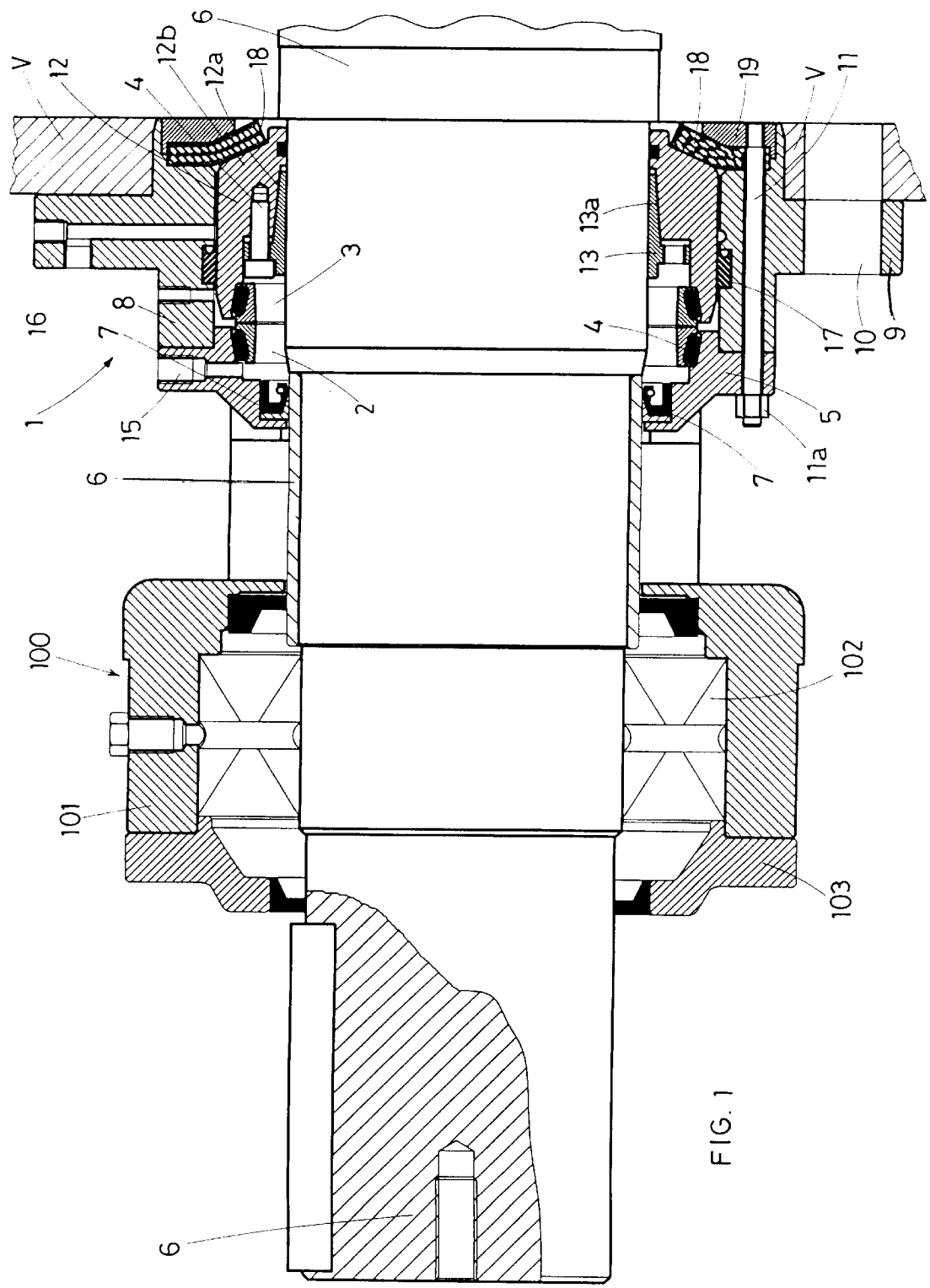

SEAL ASSEMBLY FOR INSTALLATION ON SHAFTS OF MIXERS FOR CONCRETE, MORTAR AND SIMILAR MIXTURES

The present patent application relates to a seal assembly for installation on shafts of mixers for concrete, mortar and similar mixtures, in order to prevent the mixture from reaching the shaft bearing.

Mixers comprise large tanks provided with rotating arms for the continuous mixing of concrete until the desired mixture is obtained. In each mixer, the arms are actuated by a shaft with horizontal axis arranged across the tank by means of suitable attachment holes located on two opposite walls of the tank.

The two ends of the shaft are supported by support assemblies with bearing, located just outside the external edge of the tank. Seal assemblies are installed on the attachment holes located on two opposite tank walls to prevent the fluid or dry mass from leaking out of the tank through the small space that exists between the shaft and its attachment holes.

In fact, in such a case the mixture leakage would inevitably flow towards the outside along the rotating shaft, reaching the bearing contained in the adjacent support assembly.

Obviously, this could cause great damage since, after penetrating into the bearing, the concrete would create friction, impair rotation and cause breakage. In order to prevent this from occurring, the traditional technology provides for the installation of a seal assembly on each attachment holes of the shaft on mixer tanks.

The known types of seal assemblies operate according to the so-called sliding seal principle. They comprise two rings with front sliding surfaces in oil bath. One of the rings is rigidly fixed to the body of the seal block and the other ring is joined to the shaft and therefore rotates with the shaft around the same axis.

As it is known, the two sliding rings are capable of ensuring seal for two different reasons. First of all, they are tightly pressed one against the other. Furthermore, their contact surfaces feature a very fine finish (technically defined as lapping) that allows for completely eliminating surface irregularities that could impair the perfect adhesion of the opposite sides of the two rings, thus creating a loss of seal in those points.

Moreover, according to the current technology, seal assemblies are one-piece constructions that comprise the block with bearing that supports one end of the shaft.

The purpose of the present invention is to modify the traditional technology in order to prevent any risk of concrete leakage from the mixing tank towards the shaft support bearing.

Based on the results of an accurate study, leakage is sometimes due to a seal failure of the two sliding rings. Most of the times, the imperfect seal of the two rings is due to the incorrect coupling between the sealing assembly and the rotating shaft during the assembling operations of the mixer which are mainly carried out manually.

Since the seal assembly also incorporates the block with the bearing, it is easy to understand how large and heavy this one-piece component is, also in view of the very large dimensions of concrete mixers.

The great difficulties in the manipulation of such a large, heavy component does not allow for the perfect coupling between the seal assembly and its shaft, impairing the concentricity of the two seal rings.

The slightest inaccuracy during the coupling operation may result in a loss of seal between the two lapped surfaces of the sliding rings when mixing. This may cause dangerous concrete leakage on the outside of the tank towards the bearing.

According to the present invention, two different solutions are possible. In the first solution, the seal assembly includes another gasket with optimal sealing capacities. In the second solution, the seal assembly is separated from the assembly that houses the bearing, in order to provide two different components with reduced dimensions and weight, for easier manipulation during the manual assembling operations.

In particular, the additional gasket according to the present invention is located in internal position with respect to the mixing tank, compared to the position of the traditional sliding seals. Moreover, the additional gasket is assisted by a grease/oil forced lubrication system that, as explained later on in the text, acts as an additional barrier against concrete leakage from the inside to the outside of the tank.

On the other hand, the reduced weight and increased manoeuvrability of the seal assembly according to the present invention (being separated from the bearing support assembly) allows the operators to perfectly couple the seal assembly with the rotating shaft, thus ensuring optimal installation and total seal.

For major clarity the description of the invention continues with reference to the enclosed drawing, which is intended for purposes of illustration and not in a limiting sense, whereby FIG. 1 is a cross-section of the seal assembly and the assembly that supports one end of the mixer shaft with an axial plane.

With reference to this figure, the seal assembly (1) comprises two sliding rings (2 and 3) in oil bath. The fixed ring (2) is supported, by means of a gasket (4), by a collar (5) in which the shaft (6) with seal gasket (7) is inserted.

The collar (5) is coupled to a sleeve (8) having an external shoulder (9) with holes (10) used to insert bolts (not shown) to fix it against the external surface of the wall of the tank (V).

The collar (5) is fixed to the sleeve (8) by means of bolts (11).

The seal ring (3) is supported by a collar (12) joined to the shaft (1) by means of a collar (13) splined on the shaft (1), having the external truncated-conical surface (13a) that exactly matches the corresponding surface (12a) inside the collar (12).

In fact, the collar (13) is tightened inside the collar (12) by means of fixing screws (14) that determine the interference and therefore the tight adherence between the aforesaid truncated-conical surfaces (12a and 13a).

The fixed sleeve (8) is provided with an external nozzle (15) used to insert the oil that fills up the chamber which houses the two seal rings (2 and 3).

The sleeve (8) is provided with another nozzle (16) for the forced introduction of lubrication oil into the narrow space between the fixed sleeve (8) and the rotating collar (12). A gasket (17) is located in intermediate position to prevent the forced oil from flowing and reaching the adjacent chamber with the two rings (2 and 3) that, as mentioned above, operate in bath oil, with atmospheric pressure.

An annular gasket (18), preferably made of Vulkollan/adiprene, is installed on the side of the seal assembly (1) that faces the inside of the tank. The gasket (18) is frontally held by a metal ring (19) against the suitably shaped edges of the fixed sleeve (8) and the, rotating collar (12).

More precisely, the stop collar (19) is joined at the ends of the bolts (11) so that the tightening (11a) of the bolts (11)

implies the progressive compaction of the collar (5) of the sleeve (8) and of the stop collar (19).

During compaction the external edge of the annular gasket (18) is progressively squeezed against the fixed sleeve (8), while the internal edge is squeezed and adheres against the rotating collar (12), assuming the same tilted profile towards the inside of the tank (V).

The sliding of the annular gasket (18) against the tilted front profile of the rotating collar (12) is favoured by the lubrication ensured by the presence of oil inside the narrow space between the sleeve (8) and the collar (12).

In fact, the pressure allows the oil to penetrate between the collar (12) and the annular gasket (14) and disperse, drop by drop, on the outside of the seal assembly (1) towards the inside of the mixing tank (V).

The bearing support assembly (100) is separated from the seal assembly (1) and located in external position with respect to the seal assembly (1).

In particular, the bearing supporting assembly (100) comprises the housing box (101) of the bearing (102) and its closing lid (103). The box (101) is flanged and fixed to the fixed sleeve (8) of the seal assembly (1) by means of bolts.

What is claimed is:

1. A seal assembly for a mixer shaft used with a tank containing cement comprising:
   a first fixed seal ring (2) and a second rotating seal ring (3), the first seal ring is supported by a first collar (5), the first collar (5) is coupled to a sleeve (8),
   the second seal ring is supported by a second collar (12), the second collar (12) being joined to the shaft and rotating therewith,
   an annular gasket (18) oriented toward the tank and held therein by a stop collar (19), the annular gasket contacting the sleeve (8) and a tapered side to the second collar (12).

2. The seal assembly of claim 1, wherein a space is formed between the second collar (12) and the sleeve (8), a lubricant being introduced into said space.

3. The seal assembly of claim 1, wherein the second collar (12) has an external truncated-conical surface, a third collar (13) is splined to the mixer shaft, the third collar (13) having a cooperating external truncated-conical surface, the second collar being connected to the third collar by a fixing screw.

4. In a mixer shaft for a cement mixer having a bearing assembly (100) having a bearing (102) supporting the shaft (6) and a sealing assembly (1) having a fixed sealing ring (2) and a rotating sealing ring (3), the improvement comprising:
   the bearing assembly (100) being axially displaced and separate from the sealing assembly (1),
   the sealing assembly having a first collar (13) splined to the shaft (6), the first collar having an external surface tapered in a first direction, a second collar (12) having an external surface tapered in an opposite second direction, the tapered surfaces cooperating with one another, the first collar being connected to the second collar by a fixing screw (14) bringing the tapered surfaces in close contact,
   an annular gasket (18),
   a stop collar (19) pressing the annular gasket against a tapered side of the rotating collar (12),
   the first collar (13), the second collar (12) and the annular gasket (18) rotating around the shaft (6) and carrying a rotating seal ring (3),
   a fixed seal ring (2) adjacent to the rotating seal ring (3) and,
   a lubricating passage in the sealing assembly for lubrication of the sealing assembly,
   wherein the sealing assembly is easily coupled to the shaft independently of the bearing assembly.

* * * * *